(No Model.)
J. H. GÖETSCHE.
GRINDING WHEEL ATTACHMENT.
No. 478,854. Patented July 12, 1892.
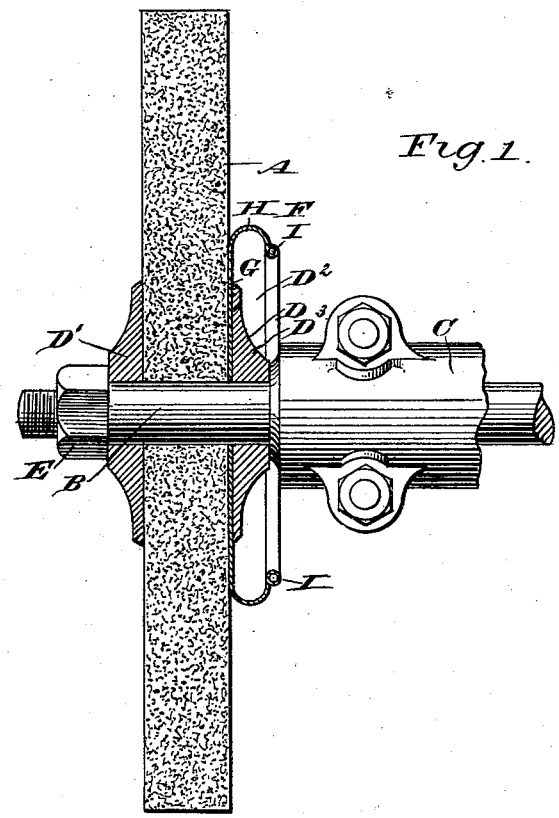
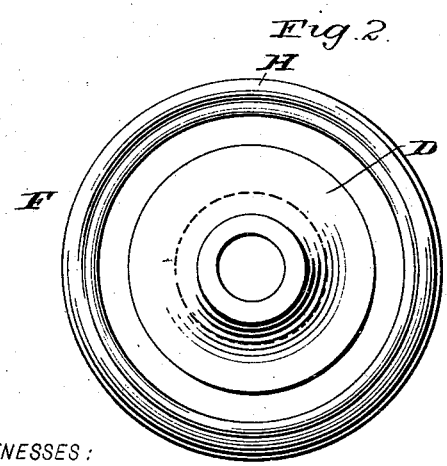
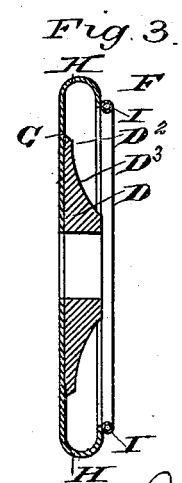
WITNESSES:
INVENTOR:
J. H. Göetsche
BY Munn & Co.
ATTORNEYS

UNITED STATES PATENT OFFICE.

JOHN HENRY GÖETSCHE, OF SAN FRANCISCO, CALIFORNIA.

GRINDING-WHEEL ATTACHMENT.

SPECIFICATION forming part of Letters Patent No. 478,854, dated July 12, 1892.

Application filed February 27, 1892. Serial No. 423,073. (No model.)

*To all whom it may concern:*

Be it known that I, JOHN HENRY GÖETSCHE, of San Francisco, in the county of San Francisco and State of California, have invented a new and Improved Grinding-Wheel Attachment, of which the following is a full, clear, and exact description.

The object of the invention is to provide a new and improved attachment designed more especially for use on emery and other grinding-wheels, to protect the work from oil or other lubricant escaping from the bearings and usually scattered over the surface of the wheel, thereby impairing the utility of the wheel for grinding purposes.

The invention consists of a casing formed with an annular recess to retain the oil, the inner wall of the casing resting on the face of the wheel and being held in place by a washer.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a sectional side elevation of the improvement as applied. Fig. 2 is a face view of the improvement, and Fig. 3 is a transverse section of the same.

The grinding-wheel A, of emery or other material, is held on the spindle B, mounted to turn in a suitable bearing C, as is plainly shown in Fig. 1. On the face of the wheel A abut the washers D and D', of which the washer D is adjacent to the bearing C, and the other outside washer D' is engaged by a nut E, screwing on the outer threaded end of the spindle B. On the washer D is held a casing F, preferably made of sheet metal and formed with an inner wall G, abutting against the face of the grinding-wheel A.

From the wall G of the casing F extends an annular semicircular flange H, the front edge of which preferably terminates in a wire I, for stiffening the casing, as is plainly shown in the drawings. It will be seen that this semicircular annular flange H forms a recess $D^2$ in the casing, so that oil or other lubricant issuing from the end of the bearing C passes on the curved face $D^3$ of the washer D, and by centrifugal force is thrown outward until the outward movement is interrupted by the lubricant striking the semicircular flange H, which thus retains the lubricant in the casing. It will be seen that as the inner wall G of the casing bears snugly upon the outer face of the washer D a tight joint is formed between the washer, wall G, and casing F, to prevent any lubricant from passing to the face of the grinding-wheel. As the front of the casing is open, the accumulating lubricant in the recess $D^2$ can be readily wiped out by a sponge or other suitable device. Thus it will be seen that all the lubricant passing out of the bearing is readily gathered by the casing F and retained therein, so that no lubricant can pass upon the grinding-wheel.

Having thus described my invention, I claim as new and desire to secure by Letters Patent—

1. A grinding-wheel attachment provided with a casing formed with an annular flange for retaining the oil, substantially as shown and described.

2. A grinding-wheel attachment comprising a casing formed with an inner wall and a semicircular annular flange extending from the outer edge of the said wall, and a washer engaging the said wall and extending in the casing, substantially as shown and described.

3. A grinding-wheel attachment comprising a casing formed with an inner wall and a semicircular annular flange extending from the outer edge of the said wall, and a washer engaging the said wall and extending in the casing, the said washer being formed with a curved face to lead the lubricant to the inside of the casing, substantially as shown and described.

JOHN HENRY GÖETSCHE.

Witnesses:
JOHN MASON,
CHAS. HENNE.